(12) United States Patent
Tseng et al.

(10) Patent No.: US 6,944,561 B2
(45) Date of Patent: Sep. 13, 2005

(54) METHOD FOR DETECTION OF MANUFACTURE DEFECTS

(75) Inventors: Shian-Shyong Tseng, Department of Computer and Information Science, National Chiao Tung University, Hsinchu 300 (TW); Wei-Chou Chen, Hsinchu (TW); Ching-Yao Wang, Hsinchu (TW)

(73) Assignee: Shian-Shyong Tseng, Hsinchu (TW)

(*) Notice: Subject to any disclaimer, the term of this patent is extended or adjusted under 35 U.S.C. 154(b) by 4 days.

(21) Appl. No.: 10/745,753

(22) Filed: Dec. 27, 2003

(65) Prior Publication Data
US 2005/0149282 A1 Jul. 7, 2005

(51) Int. Cl.[7] .............................................. G06F 19/00
(52) U.S. Cl. ..................... 702/84; 382/144; 382/149; 700/110; 702/83; 702/182; 716/4
(58) Field of Search ................... 702/81–84, 182–183; 700/108–110, 115; 716/4; 382/144–145, 149

(56) References Cited

U.S. PATENT DOCUMENTS

| | | | | |
|---|---|---|---|---|
| 5,475,766 A | * | 12/1995 | Tsuchiya et al. | ............ 382/144 |
| 5,991,699 A | * | 11/1999 | Kulkarni et al. | ............... 702/83 |
| 6,148,099 A | * | 11/2000 | Lee et al. | .................... 382/149 |
| 6,202,037 B1 | * | 3/2001 | Hattori et al. | ............... 702/182 |
| 6,341,241 B1 | * | 1/2002 | Mugibayashi et al. | ....... 700/110 |
| 6,826,735 B2 | * | 11/2004 | Ono et al. | ...................... 716/4 |

* cited by examiner

Primary Examiner—John Barlow
Assistant Examiner—John Le
(74) Attorney, Agent, or Firm—TransPacific Law Group

(57) ABSTRACT

A novel method for detection of manufacture defects is disclosed. The invented method is designed to discover root cause machine sets that cause defects in product manufactured in a process wherein a plurality of machines is involved. The method includes obtaining manufacture data that relate to manufacture of products in the manufacture process, generating a candidate list of machine set by analyzing the manufacture data wherein the machine set includes machines relative to defects in the products, and identifying root cause machine sets from the list of machine set wherein the root cause machine sets include machines highly related to the defects.

4 Claims, 4 Drawing Sheets

Table I

| PID | $S_1$ | $S_2$ | $S_3$ | D |
|---|---|---|---|---|
| 1 | $m_{11}$,1 | $m_{21}$,3 | $m_{31}$,10 | 1 |
| 2 | $m_{12}$,5 | $m_{21}$,8 | $m_{32}$,12 | 0 |
| 3 | $m_{11}$,2 | $m_{22}$,7 | $m_{31}$,13 | 1 |
| 4 | $m_{11}$,4 | $m_{22}$,6 | $m_{32}$,14 | 1 |
| 5 | $m_{12}$,7 | $m_{21}$,11 | $m_{31}$,15 | 0 |

Fig. 3

Table II

| Machine | Involved Products | Defect Coverage |
|---|---|---|
| $m_{11}$ | $p_1, p_3, p_4$ | 60% |
| $m_{12}$ | $p_2, p_5$ | 0 |
| $m_{21}$ | $p_1, p_2, p_5$ | 20% |
| $m_{22}$ | $p_3, p_4$ | 40% |
| $m_{31}$ | $p_1, p_3, p_5$ | 40% |
| $m_{32}$ | $p_2, p_4$ | 20% |

Fig. 4

Table III

| Machine | Defect Coverage | Involved Products |
|---|---|---|
| $m_{11}, m_{22}$ | 40% | $p_3, p_4$ |
| $m_{11}, m_{31}$ | 40% | $p_1, p_3$ |
| $m_{22}, m_{31}$ | 20% | $p_3$ |

Fig. 5

Table IV

| Machine | Defect Coverage | Involved Products |
|---|---|---|
| $m_{11}$ | 60% | $p_1, p_3, p_4$ |
| $m_{22}$ | 60% | $p_3, p_4$ |
| $m_{31}$ | 60% | $p_1, p_3$ |
| $m_{11}, m_{22}$ | 40% | $p_3, p_4$ |
| $m_{11}, m_{31}$ | 40% | $p_1, p_3$ |

Fig. 6

Table V

| Machine | $\phi$ | Continuity | Interestingness $\phi'$ |
|---|---|---|---|
| $m_{11}$ | 1 | 1 | 1 |
| $m_{22}$ | 0.67 | 1 | 0.67 |
| $m_{31}$ | 0.167 | 1 | 0.167 |
| $m_{11},m_{22}$ | 0.67 | 1 | 0.67 |
| $m_{11},m_{31}$ | 0.67 | 1 | 0.67 |

$$\phi = \frac{|A \& B| - |A||B|/N}{\sqrt{|A||B|(1-|A|/N)(1-|B|/N)}} \text{ in formula (1)}$$

Fig. 7

Table VI

| Case name | Data size (Products*Stages) | Number of machines |
|---|---|---|
| Case 1 | 152*1318 | 2726 |
| Case 2 | 277*1704 | 4370 |
| Case 3 | 239*1436 | 2004 |
| Case 4 | 126*1736 | 4437 |
| Case 5 | 139*1676 | 4410 |
| Case 6 | 114*1250 | 3485 |
| Case 7 | 53*1176 | 2414 |
| Case 8 | 484*1420 | 3381 |
| Case 9 | 106*1266 | 2618 |

Fig. 8

Table VII

| Case name | Rank (Threshold=0.4) | Rank (Threshold=0.5) | Rank (Threshold=0.6) |
|---|---|---|---|
| Case 1 | 10 | 5 | 2 |
| Case 2 | 1 | X | X |
| Case 3 | 16 | 7 | 3 |
| Case 4 | 1 | 1 | 1 |
| Case 5 | 1 | 1 | X |
| Case 6 | 4 | 4 | 4 |
| Case 7 | 167 | 101 | 62 |
| Case 8 | 1 | 1 | X |
| Case 9 | 2 | 2 | X |

Fig. 9

METHOD FOR DETECTION OF MANUFACTURE DEFECTS

FIELD OF THE INVENTION

The present invention relates to a method for detection of manufacture defects, especially to a method for detection of manufacture defects using the approach of data mining.

BACKGROUND OF THE INVENTION

In recently years, manufacturing procedure for industrial products has become more and more complicated. In order to meet high expectation in yield rate, prompt identification of root causes that make defects occur is required. The industry has developed various ways to detect manufacture defects. As may be seen in the industry, process control, statistical analysis and all kinds of test procedures are used to establish a solid base to improve the yield rate in the manufacture process. However, identification of root causes is still difficult, partly due to the fact that the root causes are brought up by a plurality of factors and the factors interact in a nonlinear manner.

With the huge amount of semiconductor engineering data stored in database and the variety of analytical charts and reports in production and development, the CIM, MES and EDA systems help the semiconductor industry to analyze the collected information to allocate root causes. As the semiconductor manufacture procedure is sophisticated and data collected from the procedure are in a large quantity, several statistical methods, such as the K–W test, the covariance analysis, the regression analysis etc. are used to conduct preliminary analysis of the raw data. The result, however, could add more than useful indexes to the existing data, which would not be easily understood by users. Besides, false alarms are frequently generated so that users spend unnecessary time to verify the alarms.

V. Raghavan applied decision tree to discover the root cause of yield loss in integrated circuits. See V. Raghavan, "Application of decision tree for integrated circuit yield improvement", IEEE/SEMI Advanced Semiconductor Manufacturing Conference & Workshop, 2002.

M. Gardner and J. Bieker combined self-organizing neural networks and rule induction to identify the critical poor yield factors from normally collected wafer manufacturing data. See M. Gardner and J. Bieker, "Data mining solves tough semiconductor manufacturing problems", ACM KDD Conference, Boston, USA, 2000.

F. Mieno et al. applied a regression tree analysis to failure analysis in LSI manufacturing. See F. Mieno et al., "Yield improvement using data mining system", IEEE Semiconductor Manufacturing Conference, 1999.

OBJECTIVES OF THE INVENTION

It is thus the objective of this invention to provide a novel method for detection of manufacture defects.

It is also an objective of this invention to provide a method for automatic detection of root causes of manufacture defects.

It is also an objective of this invention to provide a method for automatic detection of root causes of defects in a complicated manufacture procedure.

SUMMARY OF THE INVENTION

According to the present invention, a novel method for detection of manufacture defects is disclosed. The invented method is designed to discover root cause machine sets that cause defects in product manufactured in a process wherein a plurality of machines is involved. The method comprises obtaining manufacture data that relate to manufacture of products in the manufacture process, generating a candidate list of machine set by analyzing the manufacture data wherein the machine set includes machines relative to defects in the products, and identifying root cause machine sets from the list of machine set wherein the root cause machine sets include machines highly related to the defects.

These and other objectives and advantages of this invention may be clearly understood from the detailed description by referring to the following drawings.

Table I shows a manufacture process record to include a three-staged manufacture process for a batch consisted of 5 products.

Table II shows defect coverage values of respective machines in Table I.

Table III shows defect coverage values of respective machine sets consisted of two machines in Table II.

Table IV shows machine sets as selected as candidate and their respective defect coverage values.

Table V shows interestingness values of the respective candidate machine sets of Table IV.

Table VI shows details of 9 datasets of manufacture data.

Table VII shows ranking of the root cause machine set among all candidate machine sets generated by the method for detection of manufacture defects after processing data of cases of Table VI.

DETAILED DESCRIPTION OF THE INVENTION

The present invention discloses a novel system and method for detection of manufacture defects. The invented system and method are designed to discover root cause machine sets that cause defects in product manufactured in a process wherein a plurality of machines is involved.

Figure 1:
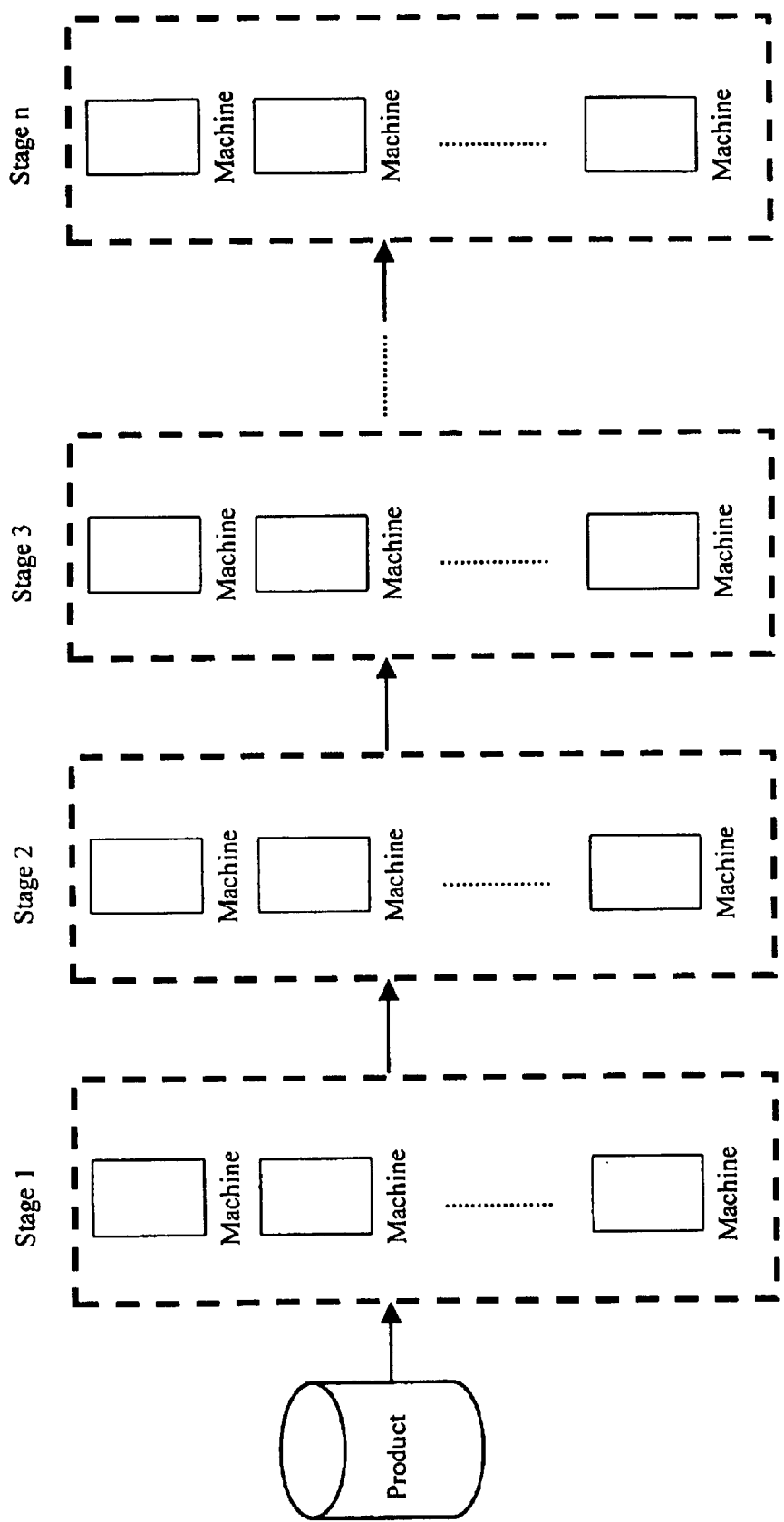
FIG. 1 shows the block diagram of a general manufacture process.

FIG. 1 shows the block diagram of a general manufacture process. As shown in this figure, the manufacture of a product may require a multi-stage procedure. In each stage, Stage 1 through to Stage n, more than one machine may be involved. Products in process may be processed by respective machines during one step.

Suppose a batch is consisted of k products $\{p_1, p_2, \ldots, p_k\}$, and each product is processed through 1 stages $<s_1, s_2, \ldots, s_l>$ in sequence. A stage may contain one or more machine. Let $M=\{m_{ij}|1 \leq i \leq l, 1 \leq j \leq \delta_i\}$ be a set of machines in the manufacture procedure with l stages, where $m_{ij}$ denotes the j-th machine in the i-th stage and $\delta_i$ is the number of machine in the i-th stage. A manufacture process relation= $\{t_1, t_2, \ldots, t_k\}$ based on a schema (PID, $S_1, S_2, \ldots, S_l$, D) can be used to record the sequential processing procedure for each product to include the machine in each stage and its final test result, where PID is an identification attribute used to uniquely label the products. $S_i = <m_{ij}, t_i>$, $1 \leq i \leq l$, is a content attribute used to record the pair of manufacture machine in the i-th stage and the time stamp after this stage. D is a class attribute representing whether product p is defected or not.

Table I shows a manufacture process record to include a three-staged manufacture process for a batch consisted of 5 products. The tuple with PID=1 show that Product 1 passes through Stage 1 by <$m_{11}$, 1>, Stage 2 by <$m_{21}$, 3> and then Stage 3 by <$m_{31}$, 10> and its test result is "Defected". The other tuples have similar meaning.

According to this invention, the method comprises: obtaining manufacture data that relate to manufacture of products in the manufacture process, generating a candidate list of machine set by analyzing the manufacture data wherein the machine set includes machines relative to defects in the products, and identifying root cause machine sets from the list of machine set wherein the root cause machine sets include machines highly related to the defects. Detailed description of examples of these steps will be given below.

Candidate of Machine Set

A level-wise candidate selection process is used to generate a list of candidate set of machines (machine set) possibly causing defects to the products during the manufacture procedure. In the selection of the candidate machine sets the defect coverage of the machine sets is taken as reference. The term "defect coverage" denotes ratio of number of defected product with which machine(s) belonging to a machine set is involved, to total number of product, represented by percentage.

For each machine in Table I, the defect coverage is shown in Table II. Table II shows defect coverage values of respective machines in Table I. As shown, the first tuple shows that three products, $p_1$, $p_3$ and $p_4$ involved machine $m_{11}$ and all of them are defected. The defect coverage of $m_{11}$ is thus 3/5=60%.

A user-specified threshold is used to select candidate machines with defect coverage greater than the threshold. For example, if the threshold is 40%, machines $m_{11}$, $m_{22}$ and $m_{31}$ are selected as candidate machines. Each selected machine is defined as a machine set, called candidate machine set.

When candidate machine sets consisted of one machine are selected, candidate machine sets consisted of two machines are selected, using the same or different user-specified threshold.

In the embodiment of the present invention, machine sets consisted of two machines are organized by the combination of two elements of machines belonging to the set consisted of all selected machines in the previous stage of selection of candidate machine set. For example, in the first stage, three machines $m_{11}$, $m_{22}$ and $m_{31}$ are selected. At the second stage of selection, machine sets $\{m_{11}, M_{22}\}$, $\{m_{11}, M_{31}\}$ and $\{m_{22}, m_{31}\}$ are organized. Defect coverage values are calculated according to the same method. Table III shows defect coverage values of respective machine sets consisted of two machines in Table II. If the same threshold is used, two additional machine sets $\{m_{11}, m_{22}\}$ and $\{m_{11}, m_{31}\}$ are thus selected as candidate machine sets.

In the following stage, machine sets consisted of one more element belonging to candidate machine sets selected in the previous stage and with defect coverage values greater than an applicable threshold are examined and selected, in a similar way.

Selection of candidate machine sets is conducted repeatedly by increasing by one the number of element of machine set to be examined, until the machine set including all machines belonging to all candidate machine sets selected in the previous stage has been examined.

In the third stage of the embodiment of Table III, machine set $\{m_{11}, m_{22}, m_{31}\}$ is not examined, since machine set $\{m_{22}, m_{31}\}$ is not selected in the previous stage.

When selection of candidate machine sets is completed in this stage, we have 5 machine sets as shown in Table IV as selected. Table IV shows machine sets as selected as candidate and their respective defect coverage values. The selected candidate machine sets are $\{m_{11}\}$, $\{m_{22}\}$, $\{m_{31}\}$, $\{m_{11}, m_{22}\}$ and $\{m_{11}, m_{31}\}$.

Interestingness Ranking

In deciding the relation between the defected products and the root cause machine or machine set, the following formula is used to calculate interestingness value $\phi'$.

$$\phi' = \frac{|A \text{ \& } B| - |A||B|/N}{\sqrt{|A||B|(1-|A|/N)(1-|B|/N)}} * \text{Continuity} \quad (1)$$

wherein N is the total number of products from a manufacture procedure, A represents a machine set, B represents a defect item set, |A| is the number of products that involve A, |B| is the number of products that involve B, and |A&B| be the number of products that involve A and B; "Continuity" represents sequential relation between defects of product and a candidate machine set and is calculated according to the following formula:

$$\begin{cases} \text{Continuity} = 0 & \text{if } |X| \leq 1 \\ \text{Continuity} = \dfrac{1}{\sum_{i=1}^{i=|X|-1} d(\alpha(x_i), \alpha(x_{i+1}))/|X|-1} & \text{if } |X| > 1 \end{cases} \quad (2)$$

where $X=(x_1, x_2, \ldots)$ denotes a sequence consisting of the defective products in the involved product sequence $P=(p_1, p_2, \ldots)$ for a machineset (i.e., X is a subsequence of P), |X| denotes the number of defective products, $\alpha(x_i)$ denotes the defective product $x_i$ is the k-th product in the involved product sequence if $\alpha(x_i)=k$, and $d(\alpha(x_i),\alpha(x_{i+1}))$ is the distance of $\alpha(x_i)$ and $\alpha(x_{i+1})$ and it can be easily calculated by $\alpha(x_{i+1})-\alpha(x_i)$.

In the above example, machine $m_1$ is involved in the product sequence of ($p_1$, $p_3$, $p_4$, $p_5$, $p_6$) and the related defected product sequence is ($p_1$, $p_3$, $p_5$). Therefore, the Continuity of m is:

$$\frac{1}{(d(\alpha(p_1), \alpha(p_3)) + d(\alpha(p_3), \alpha(p_3)))/(3-1)} = \frac{1}{(1+2)/2} = 0.67$$

The Continuity of $m_2$ is 0 since number of defected product $m_2$ involved is 0.

After the interestingness values of all candidate machine sets are obtained, the machine set(s) with interestingness value greater than a predetermined value is selected as the root cause machine set(s).

In the above example, interestingness values of the respective candidate machine sets are shown in Table V. If a candidate machine set with highest interestingness value will be treated as the root cause machine set, candidate machine set $\{m_{11}\}$ is selected as the root cause machine set, as its interestingness value is greatest among all.

EMBODIMENT

Figure 2:
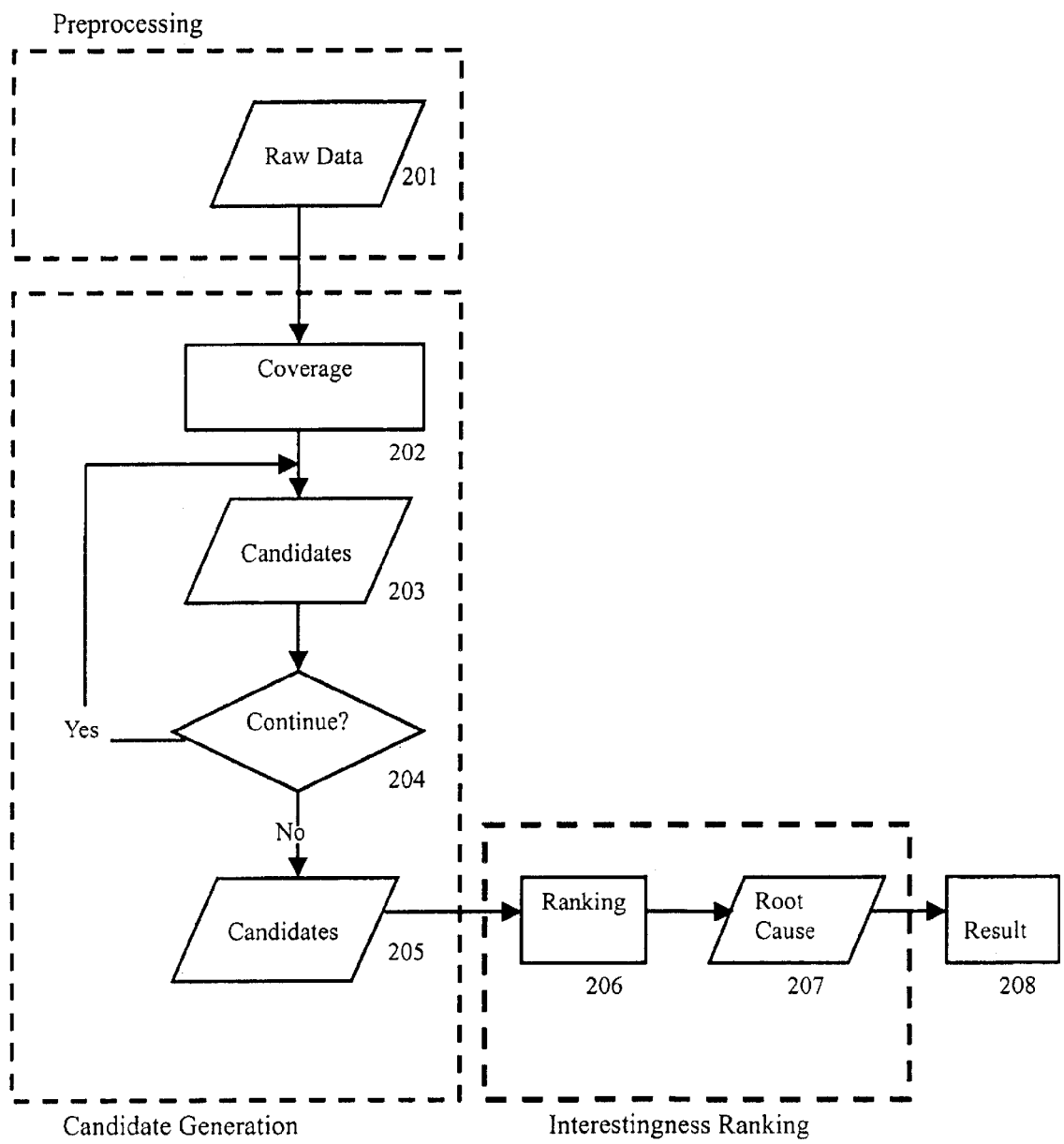
FIG. 2 illustrates the flowchart of the method for detection of manufacture defects of this invention.

The method for detection of manufacture defects will be described and illustrated by an embodiment in the followings. FIG. 2 illustrates the flowchart of the method for detection of manufacture defects of this invention.

As shown in this figure, at 201 raw manufacture data are obtained. The manufacture data may include information such as number and sequence of stage and machine in a production process, number, sequence and quality (defected or not defected) of products as manufactured, and respective manufacture sequence of products involved. Of course, other useful information may also be included as manufacture data, as long as it may be taken for reference in the detection of manufacture defects in this invention.

At 202 relative machine sets are examined by calculating their defect coverage values and compare the values with predetermined threshold(s). At 203 candidate machine sets are selected. At 204 the system determines whether a further stage of machine sets shall be examined. If yes, the process returns to step 202; otherwise, the selected candidate machine sets are collected at 205. At 206 the interestingness values of all candidate machine sets are calculated. At 207 the values are compared with a determined value and at 208 the candidate machine set with interestingness value greater than the predetermined value is selected as root cause machine set.

EXPERIMENTS

In order to prove the effect of this invention, an experiment is conducted. A Pentium-IV 2.4 G Hz desktop computer with 512 MB RAM is used to detect manufacture defects in 9 live datasets, as shown in Table VI. Table VI shows details of 9 datasets of manufacture data. In the Table, data size represents number of product involved times number of stage involved. For example, in the first tuple (Case 1), 152 products each of them passing through 1318 stages and using 2726 machines are involved.

Set the threshold of defect coverage to between 0.4 and 0.6. The result of selection of candidate machine set is shown in Table VII. Table VII shows ranking of the root cause machine set among all candidate machine sets generated by the method for detection of manufacture defects after processing data of cases of Table VI. In this table, X represents the case where no root cause is discovered. As shown in this Table VII, the root cause machine sets in most of the live data sets can be ranked in top five of the table, when a suitable threshold of defect coverage is applied. Case 7 is exceptional. This is because in Case 7, manufacture data of only 53 products were given, therefore the root cause machine set is not significant when compared with others.

As the present invention has been shown and described with reference to preferred embodiments thereof, those skilled in the art will recognize that the above and other changes may be made therein without departing from the spirit and scope of the invention.

What is claimed is:

1. A method for detection of manufacture defects, comprising:

obtaining manufacture data including number and sequence of stage and machine in a manufacture process, number, sequence and quality of products as manufactured, and respective manufacture sequences of products involved;

organizing machine sets consisted of at least one machine in said manufacture process;

calculating defect coverage values from the manufacture data of respective machine set; wherein said defect coverage value comprises ratio of number of defected product processed by element machine of said machine set to total number of product;

comparing said defect coverage values with a predetermined threshold to select candidate machine sets with defect coverage values greater than said threshold; and outputting result of said candidate machine sets selected.

2. A method for detection of manufacture defects, comprising:

obtaining manufacture data including number and sequence of stage and machine in a manufacture process, number, sequence and quality of products as manufactured, and respective manufacture sequences of products involved;

organizing machine sets consisted of at least one machine in said manufacture process to generate candidate machine sets;

calculating interestingness values $\phi'$ of said candidate machine sets; wherein said calculation comprises calculation according to the following formula:

$$\phi' = \frac{|A \text{ \& } B| - |A||B|/N}{\sqrt{|A||B|(1-|A|/N)(1-|B|/N)}} * \text{Continuity} \qquad (1)$$

wherein N is the total number of products from a manufacture procedure, A represents a machine set, B represents a defect, $|A|$ is the number of products that involve A, $|B|$ is the number of products that involve B, and $|A\&B|$ be the number of products that involve A and B; "Continuity" represents sequential relation between defects of product and a candidate machine set and is calculated according to the following formula:

$$\begin{cases} \text{Continuity} = 0 & \text{if } |X| \leq 1 \\ \text{Continuity} = \dfrac{1}{\sum_{i=1}^{i=|X|-1} d(\alpha(x_i), \alpha(x_{i+1}))/|X|-1} & \text{if } |X| > 1 \end{cases} \qquad (2)$$

where $X=(x_1, x_2, \ldots)$ denotes a sequence consisting of the defective products in the involved product sequence $P=(p_1, p_2, \ldots)$ for a machine set (i.e., X is a subsequence of P), $|X|$ denotes the number of defective products, $\alpha(x_i)$ denotes the defective product $x_i$ is the k-th product in the involved product sequence if $\alpha(x_i)=k$, and $d(\alpha(x_i),\alpha(x_{i+1}))$ is the distance of $\alpha(x_i)$ and $\alpha(x_{i+1})$ and it can be easily calculated by $\alpha(x_{i+1})-\alpha(x_i)$;

comparing the obtained interestingness values with a predetermined value to select root cause machine sets with interestingness values greater than said predetermined value; and outputting result of said candidate machine sets selected.

3. A method for detection of manufacture defects, comprising:

obtaining manufacture data including number and sequence of stage and machine in a manufacture process, number, sequence and quality of products as manufactured, and respective manufacture sequences of products involved;

organizing machine sets consisted of at least one machine in said manufacture process;

calculating defect coverage values of respective machine set; wherein said defect coverage value comprises ratio of number of defected product processed by element machine of said machine set to total number of product;

comparing said defect coverage values with a predetermined threshold to select candidate machine sets with defect coverage values greater than said threshold;

calculating interestingness values $\phi'$ of said candidate machine sets; wherein said calculation comprises calculation according to the following formula:

$$\phi' = \frac{|A \& B| - |A||B|/N}{\sqrt{|A||B|(1-|A|/N)(1-|B|/N)}} * \text{Continuity} \quad (1)$$

wherein N is the total number of products from a manufacture procedure, A represents a machine set, B represents a defect, |A| is the number of products that involve A, |B| is the number of products that involve B, and |A&B| be the number of products that involve A and B; "Continuity" represents sequential relation between defects of product and a candidate machine set and is calculated according to the following formula:

$$\begin{cases} \text{Continuity} = 0 & \text{if } |X| \leq 1 \\ \text{Continuity} = \dfrac{1}{\sum_{i=1}^{i=|X|-1} d(\alpha(x_i), \alpha(x_{i+1}))/|X|-1} & \text{if } |X| > 1 \end{cases} \quad (2)$$

wherein X=(x1, x2, . . . ) and denotes a sequence consisted of the defective products in the involved product sequence P=(p1, p2, . . . ) for a candidate machine set, |X| denotes number of defected products, $\alpha(x_1)$ denotes the order of defected product $x_1$ in the sequence of X and d(., .) denotes difference in order between two defected products;

comparing the obtained interestingness values with a predetermined value to select root cause machine sets with interestingness values greater than said predetermined value; and outputting result of said candidate machine sets selected.

4. The method according to claim 1 or 3, wherein defect coverage values of machine sets having one element are first calculated to select candidate machine sets and wherein defect coverage values of machine sets having one more element belonging to any candidate machine set selected in the previous step are then calculated to select candidate machine sets and so on, until defect coverage value of machine set having all elements of machine sets selected form the previous step is calculated.

* * * * *